(12) United States Patent
Li

(10) Patent No.: US 6,944,225 B2
(45) Date of Patent: Sep. 13, 2005

(54) RESOLUTION-SCALABLE VIDEO COMPRESSION

(75) Inventor: Xin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 620 days.

(21) Appl. No.: 09/912,799

(22) Filed: Jul. 24, 2001

(65) Prior Publication Data

US 2003/0026341 A1 Feb. 6, 2003

(51) Int. Cl.$^7$ ................................................ H04N 7/18
(52) U.S. Cl. ............................ 375/240.19; 375/240.18
(58) Field of Search ........................ 375/240.18–240.2

(56) References Cited

U.S. PATENT DOCUMENTS

| | | |
|---|---|---|
| 5,270,813 A | 12/1993 | Puri et al. |
| 5,719,627 A | 2/1998 | Ohta |
| 5,798,795 A | 8/1998 | Glenn et al. |
| 5,852,565 A | 12/1998 | Demos |
| 5,956,088 A | 9/1999 | Shen et al. |
| 6,043,846 A | 3/2000 | Shen et al. |
| 6,160,846 A | * 12/2000 | Chiang et al. ......... 375/240.05 |

OTHER PUBLICATIONS

Amir Said, William A. Pearlman, "An Image Multiresolution Representation for Lossless and Lossy Compression," (SPIE Symposium on Visual Communications and Image Processing, Cambridge, MA, Nov. 1993).

Seung–Jong Choi, John W. Woods, "Motion–Compensated 3–D Subband Coding of Video," *IEEE Transactions on Image Processing*, vol. 8., No. 2, Feb. 1999.

Aria Nosratinia, Michael T. Orchard, "Multi–Resolution Backward Video Coding," (Beckman Institute for Advanced Science and Technology, Urbana, Illinois), 0–8186–7310–9/95 1995 IEEE.

Xuguang Yang, "Scalable Wavelet Video Coding Using Aliasing–Reduced Hierarchical Motion Compensation," *IEEE Transactions on Image Processing*, vol. 9, No. 5, May 2000.

* cited by examiner

*Primary Examiner*—Andy Rao
(74) *Attorney, Agent, or Firm*—Marger Johnson & McCollom, P.C.

(57) ABSTRACT

A method of data compression. A multiple-level wavelet transform transforms image data of an original image. Motion compensation is performed on a low-frequency band of the transformed image data. This band is then inversely transformed and used to reconstruct a portion of the original image. The remaining portions of the original image are then reconstructed from that portion. This image data then becomes the basis of the next level of the wavelet transform and is transformed back into the wavelet domain. This process is repeated until all of the levels of the wavelet transform have been used.

12 Claims, 4 Drawing Sheets

RESOLUTION-SCALABLE VIDEO COMPRESSION

BACKGROUND

1. Field

This disclosure relates to scalable video compression, more particularly to methods and apparatus for performing scalable video compression with motion compensation in the wavelet domain.

2. Background

Data compression allows less storage space or transmission bandwidth to be used than would be required without compression. Images typically require large amounts of storage space or high amounts of bandwidth for high-quality reproductions. Compression of images, both still and video, seeks to allow high-quality reproductions using the highest amount of compression possible. Compression techniques try to maintain high levels of coding efficiency.

Many standards use block-based image coding techniques. These techniques generally divide an image or a video frame within a sequence into a set of contiguous blocks of pixels. These techniques have several problems, including block-based artifacts that can surface in the reconstructed image. Also, they do not work well in scalable bit streams.

Scalable bit streams occur in heterogeneous systems. A heterogeneous system has links with varying bandwidth, such as a phone connection of 56 K bits per second (bps), an Ethernet connection of 10 Mbps, and a 1.5 Mbps T1 connection. These systems require bit streams that can be scaled to match the bandwidth of the link for the highest quality reproduction of the video sequences at the receiver on this links.

Wavelet compression techniques have found tremendous success in scalable coding of still images, but do not work well for video images because of difficulties with motion compensation and prediction between frames in the video frame sequence. Therefore, a method that allows the scalability of wavelet compression to be used on video images with accurate motion compensation will be useful.

SUMMARY

One aspect of the disclosure is a method of data compression. A multiple-level wavelet transform transforms image data of an original image. Motion compensation is performed on a low-frequency band of the transformed image data. This band is then inversely transformed and used to reconstruct a portion of the original image. The remaining portions of the original image are then reconstructed from that portion. This image data then becomes the basis of the next level of the wavelet transform and is transformed back into the wavelet domain. This process is repeated until all of the levels of the wavelet transform have been used. In this manner, a reconstructed image benefits from the advantages of wavelet transformation as a compression method without the problems of motion compensation.

BRIEF DESCRIPTION OF THE DRAWINGS

The invention may be best understood by reading the disclosure with reference to the drawings, wherein.

DETAILED DESCRIPTION OF THE EMBODIMENTS

Wavelet-based compression techniques have found tremendous success in scalable coding of still images. However, wavelets have not found similar success in progressive transmission of video due to the difficulty of exploiting temporal dependency in the wavelet domain. The major reason for the success of wavelet-based methods in scalable coding of still images is due to the fact that wavelets provide an appropriate basis for representing natural images. However, when people attempt to apply wavelet-based methods to scalable video coding, the nontrivial problem arises from the dilemma of how to couple wavelet transform (WT), which is an effective decorrelating tool in the spatial domain and motion-compensated prediction (MCP), which is an effective decorrelating tool in the temporal domain. Most existing approaches that serially connect WT and MCP in an ad-hoc fashion have only achieved limited success due to either aliasing or drifting problems.

For example, direct band-to-band prediction methods, that first apply maximally decimated wavelet transform and then perform MCP to the wavelet coefficients, ignore the negative effect of aliasing artifacts on motion estimation and seriously sacrifice the coding efficiency. The only existing solution to attack the aliasing problem within a resolution scalable framework is to resort to backward motion estimation and employ anti-aliasing filters. However, backward methods require that motion estimation be performed at both the encoder and the decoder, which dramatically increases the computational burden at the decoder. Therefore their practical application scenarios are very limited.

A higher-level understanding of the interaction between wavelet transform and motion estimation may provide unique results. With the recognition of the importance of motion accuracy in the motion estimation, it is possible to restore the motion accuracy in the wavelet domain using band-shifting or phase-shifting methods. The efficiency of motion compensated prediction may be significantly improved by the restoration of motion accuracy in the wavelet domain. This may include a hierarchical motion estimation technique in the wavelet domain. Such hierarchical motion estimation method not only facilitates the pursuit of resolution scalability but also reduces the overall computational complexity of motion estimation.

Copending U.S. patent application Ser. No. 09/877,463 demonstrates that taking the phase of wavelet transform into consideration dramatically improves the performance of MCP in the wavelet domain. This discussion shall start from a brief overview of MCP techniques in the wavelet domain and then describe how to extend such techniques to achieve resolution scalability.

Figure 1:
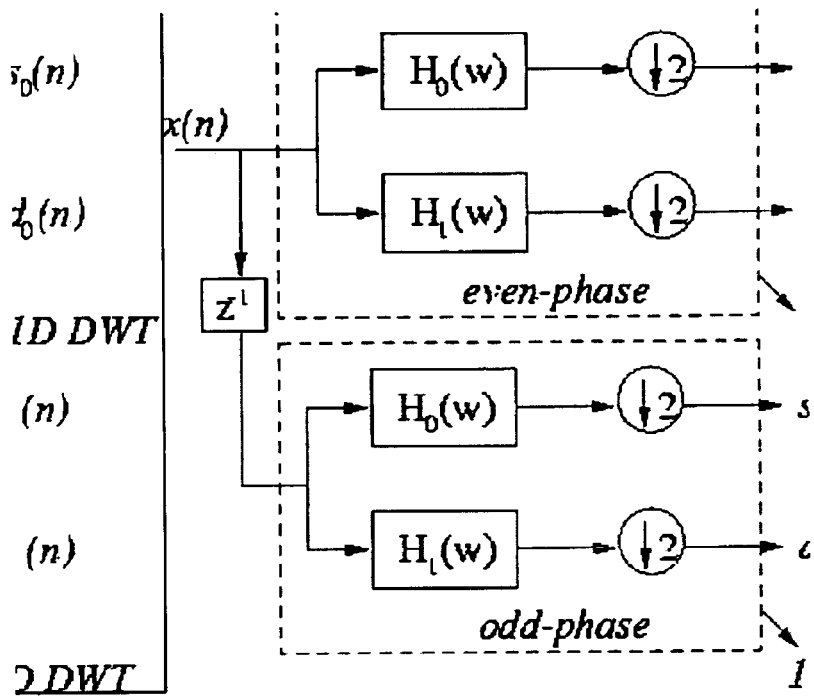
FIG. 1 shows a block diagram of one-level wavelet decomposition and its corresponding wavelet transform.

For purposes of discussion, assume a 1D-signal as an example because it is relatively straightforward to generalize from a 1D scenario to a 2D scenario. FIG. 1 shows the 1D wavelet transform applied to a 1D signal x(n), generating low-band coefficients $s_0(n)$ and high-band coefficients $d_0(n)$. It should be noted that after the down-sampling operation, the process could either preserve the even-indexed coefficients or odd-indexed coefficients. The original signal x(n) can be perfectly reconstructed from either set of coefficients. To follow the tradition of signal processing literature, these two sets of coefficients are referred to as "even-phase" and "odd-phase" coefficients.

The importance of introducing phase into wavelet transform can be understood when cast into the framework of motion estimation. In most previous approaches of performing motion estimation in the wavelet domain, only one set of coefficients (e.g. even-phase) in the previous frame is used to predict the coefficients in the current frame. This would lead to the reduction of motion accuracy by a factor of two and significantly affect the efficiency of MCP. The copending patent application referenced above proposes to restore the motion accuracy by also taking the odd-phase coefficients into the prediction. Since the odd-phase coefficients also come from the previous decoded frame, such restoration process does not require any additional overhead but only increased computations. It has been seen that the prediction efficiency of MCP can be dramatically improved by the restoration of motion accuracy in the wavelet domain. However, only one-level wavelet decomposition was considered previously.

Application of the current invention may extend the MCP techniques in the wavelet domain to multi-level decomposition and, more specifically, to meet the requirement of resolution scalability.

Resolution scalability requires that the motion estimation can be performed independently at different resolutions. In other words, MCP at a lower resolution should not assume any knowledge of the bands at higher resolutions to avoid the well-known drifting problem. It is easy to see that wavelet-based representation offers an attractive basis to achieve this goal because video is nothing but a sequence of images linked together by a motion model in the temporal domain. However, the efficiency of motion estimation in the wavelet domain is often unsatisfactory due to the same reasons mentioned above with regard to aliasing artifacts. Therefore, one must carefully consider the factor of motion accuracy in order to avoid the potential coding efficiency loss.

Figure 2:
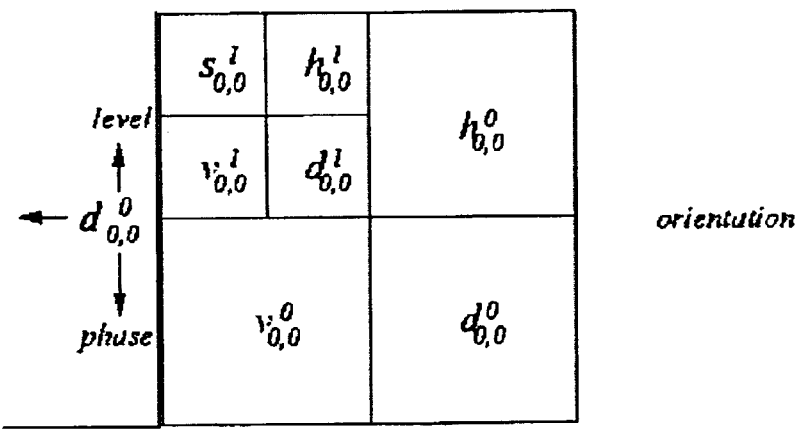
FIG. 2 shows a block diagram of two-level wavelet decomposition.

Without loss of generality, consider a two-level decomposition in the wavelet domain, as shown in FIG. 2. Motion estimation starts from the lowest band, $s_0$. Since the low bands have similar characteristics as the original frames, standard block matching methods can be applied. That is, one translational vector $(mv_x^1, mv_y^1)$ is assigned to each b×b block. Then the motion estimation is refined to the three high bands, $h_0$, $v_0$ and $d_0$, at the same resolution. The three b×b blocks in the high bands will be assigned the same motion vector and $(mv_x^1, mv_y^1)$ will be used as an initial estimate.

Figure 3:
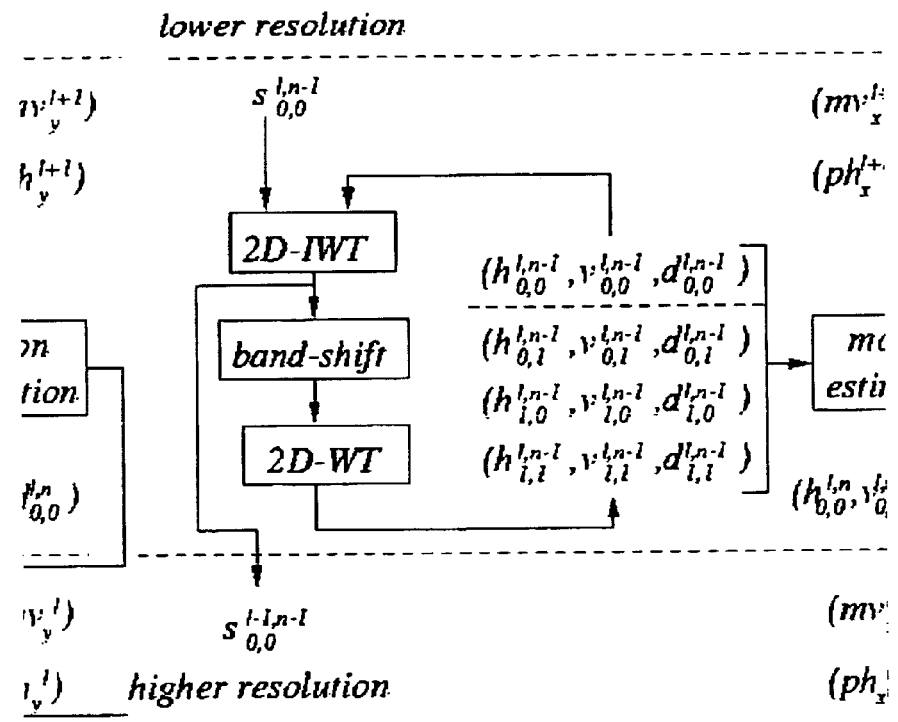
FIG. 3 shows one embodiment of motion accuracy restoration in the wavelet domain, in accordance with the invention.

In order to restore the motion accuracy, application of the invention includes applying a band-shifting method as shown in FIG. 3. Instead of using only one set of coefficients $(h_{0,0}^1, v_{0,0}^1, d_{0,0}^1)$ of the previous frame in MCP, the process obtains the other three sets of coefficients with non-zero phases and use the four complete sets of coefficients in MCP. There are two possible ways of obtaining nonzero-phase coefficients from zero-phase coefficients: one is to first apply inverse transform to the set of coefficients $(s_{0,0}^1, h_{0,0}^1, v_{0,0}^1, d_{0,0}^1)$ and obtain $s_{0,0}^0$, and then shift $s_{0,0}^0$ along horizontal/vertical/diagonal direction by one sample, and finally apply forward wavelet transform; the other is to derive a linear time-invariant (LTI) filter to directly perform phase shifting in the wavelet domain. The latter approach enjoys the simplicity of computation; however, the derivation of LTI phase shifting filter is only known for a few simple wavelet filters such as Haar filter.

Another way of interpretation is to predict the wavelet coefficients in the current frame from an overcomplete expansion of the previous frame at the corresponding resolution. The above procedure can be repeatedly performed to higher resolutions as depicted in FIG. 3. The optimal motion vector and optimal phase at a lower resolution jointly provide the initial estimate for the motion search at the higher resolution, $$m\hat{v}_x^l = 2mv_x^{l+1} + ph_x^{l+1}, m\hat{v}_y^l = 2mv_y^{l+1} + ph_y^{l+1} \qquad (1)$$

Figure 4:
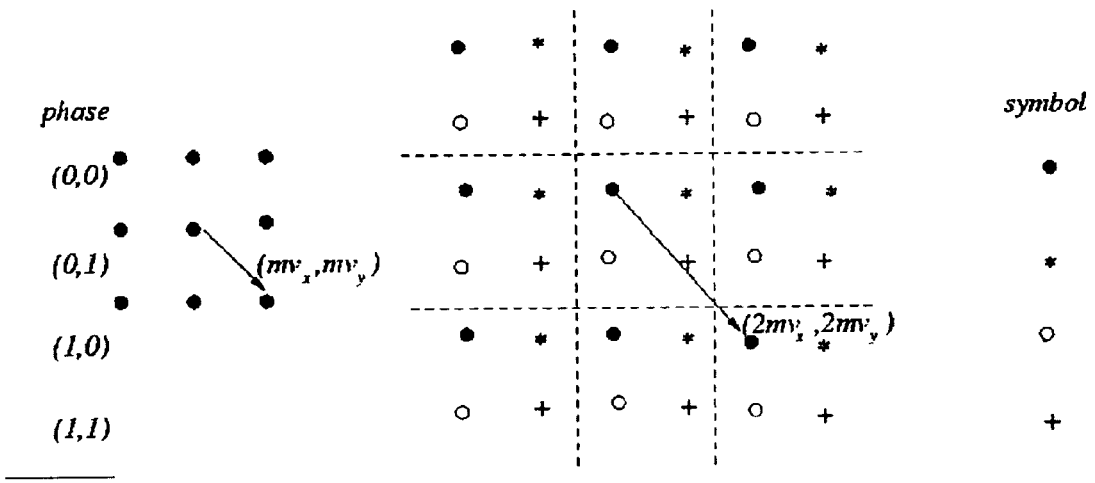
FIG. 4 shows a graphical depiction of one embodiment of motion estimation refinement in accordance with the invention.

It becomes clear that the one-bit phase along each dimension precisely carries the information of motion accuracy as the resolution increases. FIG. 4 explicitly explains the role played by the phase in a hierarchical motion estimation scheme.

Due to the requirement of resolution scalability, the process can achieve integer-pixel motion accuracy using the above-described phase-shifting methods because the fractional-pixel motion estimation has to exploit the information contained in the bands of a higher resolution. However, it is possible to achieve fractional-pixel motion accuracy using linear interpolation methods, just like previous approaches in the spatial domain. In fact, since both wavelet transform and linear interpolation are linear operations, they can be performed in arbitrary order, $$T(I(T^{-1}(X))) = I(X) \qquad (2)$$

where I and T are interpolation and transform respectively. It follows that one can omit the pair of transform operations and directly interpolate the fractional-phase coefficients from integer-phase coefficients.

Such viewpoint of motion accuracy enables the system to quantitatively analyze the efficiency loss brought by the scalability requirement. Without the scalability requirement, one can easily obtain the fractional-phase coefficients at low resolutions by shifting bands to generate different phases (no linear interpolation techniques involved). The efficiency loss solely relies on the difference between the true fractional-phase coefficients and those obtained through interpolation techniques.

Hierarchical motion estimation in the spatial domain has been widely studied and regarded as an effective way of reducing the computational complexity of block matching methods. Similar benefits brought by hierarchical motion estimation in the wavelet domain can be observed. For example, if one assumes the block size of 16×16 and the search range of [−7,7] in the spatial domain, full-search block matching requires 255×511≅130,000 arithmetic operations to obtain the sum of absolute difference. In a hierarchical way, the process can start from 4×4 block motion estimation with range of [−3,3] at low resolution and then refine the searching results within [−1,1] at higher resolutions. The overall number of operations reduces to 49×31+9×31×3+9×127×3≅6,000, which means the complexity reduction by a factor of over 20. Such computational savings are highly desired in practice, especially in many real-time applications such as video conferencing.

Figure 5:
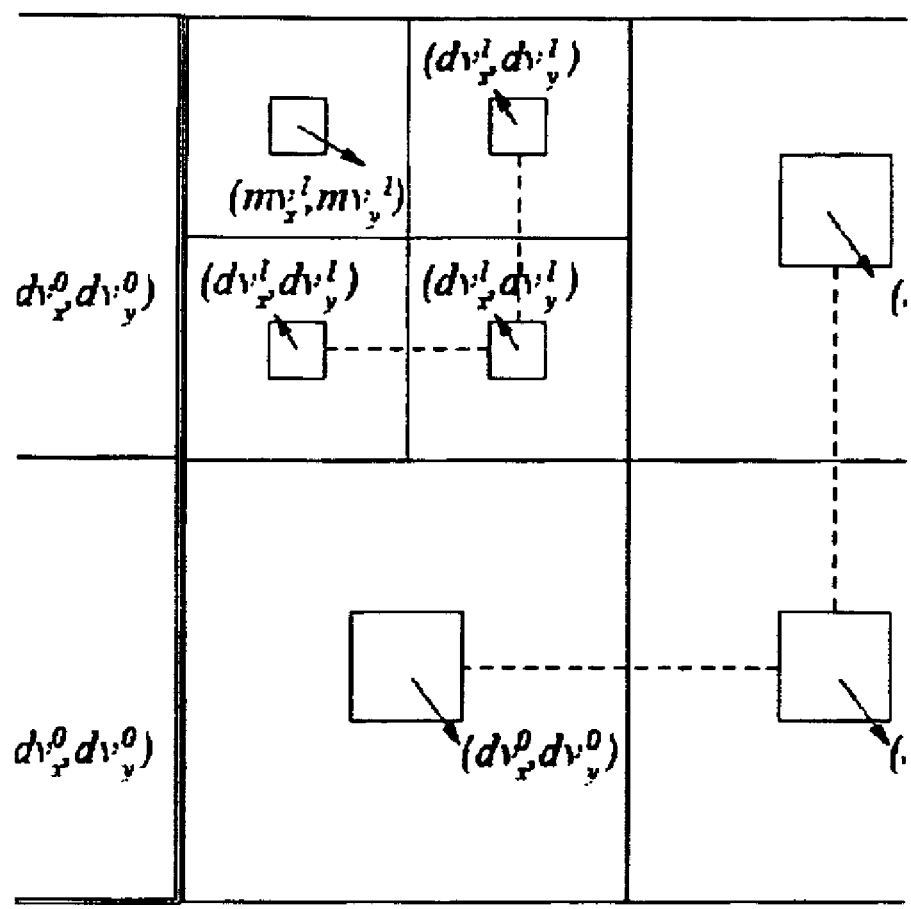
FIG. 5 shows a graphical depiction of one embodiment of hierarchical motion field representation, in accordance with the invention.

A resolution-scalable video coder can be built upon the hierarchical motion estimation technique described above. The video signals are decomposed into block-based motion field and motion-compensated residues at different resolutions. FIG. 5 shows an example of the hierarchical block-based motion field for two-level wavelet decomposition. At the lowest resolution, the optimal motion vector ($mv_x^1$, $mv_y^1$) within the range $[-3,3]\times[-3,3]$ is assigned to every 4×4 block; then the differential motion vector ($dv_x^1, dv_y^1$) within the range $[-1,1]\times[-1,1]$ and the optimal phase ($ph_x^1$, $ph_y^1$) are found for the three 4×4 blocks of the high bands at the same resolution. Finally, based on the initial estimate of (1), the differential motion vector ($dv_x^0$, $dv_y^0$) within the range $[-1,1]\times[-1,1]$ and the optimal phase ($ph_x^0, ph_y^0$) are obtained for the three 8×8 blocks of the high bands at the high resolution. All the motion vectors and phases are entered into an adaptive binary arithmetic coder after binary expansion.

A two-stage coding algorithm compresses motion-compensated residues in order to exploit the non-stationary property. The non-stationary property refers to the phenomena of large prediction errors clustering around singularities. It has been widely recognized from the practice of image coding that classification-based strategy is an effective approach of exploiting such non-stationary property. Therefore, it can be proposed to code the residues in the following two stages. In the first stage, position coding, a binary map containing the positions of large prediction errors with amplitude above a pre-selected threshold Th, are compressed by a JBIG-like coder. In the second stage, refinement coding, the sign and the quantized magnitude of large prediction errors are compressed by adaptive binary arithmetic coder after binary expansion. By adjusting Th and quantizer step size, different points along the operational Rate-Distortion curve can be achieved.

Figure 6:
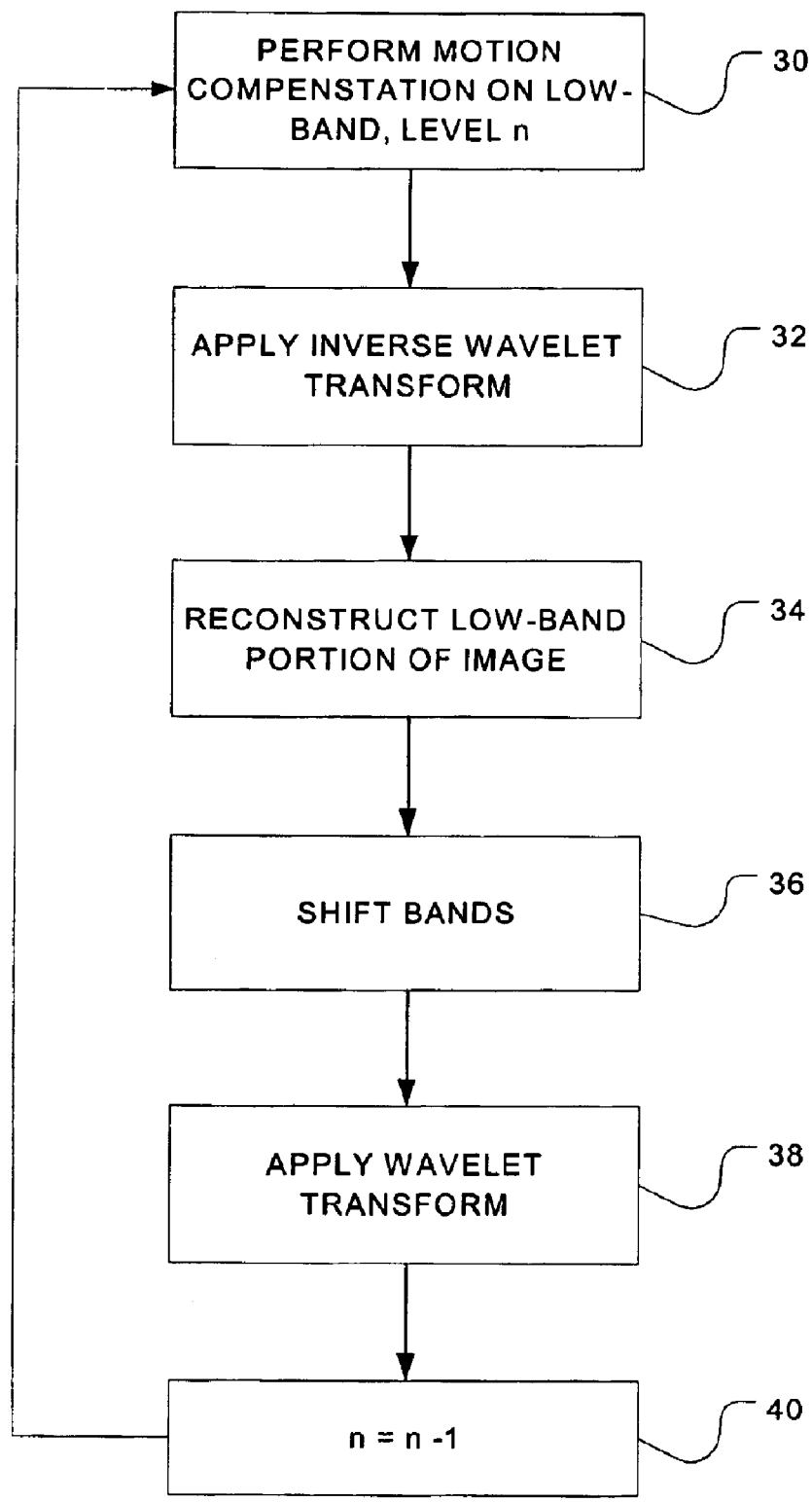
FIG. 6 shows a flowchart of one embodiment of a method of motion-compensated hierarchical wavelet compression, in accordance with the invention.

A flowchart of one embodiment of a method to provide resolution scalable video encoding in accordance with the invention and the above discussion is shown in FIG. 6. Motion compensation, as shown in FIG. 4, is performed on the low frequency band of wavelet transformed image data at 30. This produces motion compensated transformed image data. At 32, the inverse wavelet transform is then applied to the motion compensated image data. This is used to reconstruct a portion of the original image at 34. The high bands are then reconstructed by using the motion compensation and phase-shift shown in the band-shifting process in FIG. 3 at 36. This newly extrapolated image is then transformed back into the wavelet domain at 38. This then becomes the transformed image data upon which the process is repeated until all levels of the wavelet transform have been used. This is shown as if the process decrements the counter until the 'highest' level is achieved at 40. As can be seen with reference to FIG. 2, the highest level is '0' and the lowest level is '1.'

One possible implementation of the methods of the invention is as software in a video coder. The methods of the invention would be in the form of software code that, when executed, performed the above processes. The software code will more than likely be included on some form of computer-readable medium. For example, the video coder may be the computer reading the media and the media may be a code or image file.

Coding experiments were performed with the luminance components of the first 100 frames of football SIF sequence (352×240) scanned at 30 frames/second. L-level (L=1, 2 or 3) Integer S+P wavelet transform with normalization was used for its computational simplicity. The block size at the level L was chosen to be $8/2^L \times 8/2^L$; all correspond to a 16×16 block in the spatial domain. Motion search range started from $[-r,r]\times[-r,r]$ (r=max $[1,8/2^L-1]$) and were refined within $[-1,1]\times[-1,1]$ at higher resolutions. Half-pixel motion accuracy was achieved by bilinear interpolation techniques at all levels.

Table 1 includes the bit usage and the pixel signal-to-noise ratio (PSNR) results when the sequence is decoded from low to high resolution. At low resolutions, the PSNR is computed by comparing the original frame and the reconstructed frame by zero-padding into high band and applying inverse wavelet transform. It can be observed that resolution scalability can be viewed as a special case of rate scalability. A low-resolution representation of video signals typically spend fewer bits and thus introduce more distortion than a high-resolution representation.

TABLE 1

Rate-Distortion performance of resolution-scalable video coder at 800 kbps for football sequence (frame rate 30 fps).

|  | Average Bits/frame | Average PSNR(dB) |
| --- | --- | --- |
| Level 3 | 3712 | 20.16 |
| Level 2 | 5618 | 21.92 |
| Level 1 | 10769 | 24.69 |
| Level 0 | 10845 | 27.72 |

The following curve shows the Rate-Distortion performance comparison among different coders. It may be concluded that as the wavelet-based scalable coder offers more levels of resolution scalability, more coding efficiency loss is introduced due to the reason described above. However, even at 3-level scalability, the coder in the wavelet domain still achieves comparable performance to non-scalable MPEG-2 coder at the interested bit rate. Meanwhile, experimental results show that the running time of the wavelet coder is much less than that spent by in the patent application referenced above and comparable to that of MPEG-2. This confirms the advantage of hierarchical motion estimation. Additionally, the scalable wavelet video coder based on forward motion estimation in the wavelet domain dramatically outperforms a coder based on backward motion estimation in the wavelet domain, especially at high bit rate regime.

The above discussion provides specific examples for understanding of the invention, only. Other alternatives and options are available that are included in the scope of the invention. For example, the process can further improve the compression performance by exploiting the inter-band correlation like most existing wavelet-based image coders. This is based on the observation that the similarity of edge locations at different resolutions and thus the positions of large prediction errors might be correlated across the resolution. As another example, as mentioned earlier, resolution scalable coder offers some degree of rate scalability. If finer rate scalability is required, a more flexible coder could be built using layer-based decomposition for prediction residues based on the resolution scalable coder.

Thus, although specific examples of a method for resolution scalable video encoding is disclosed above, none of these examples is intended to limit the scope of the invention as is set forth in the claims.

What is claimed is:

1. A method of compressing video signals, the method comprising:

transforming both a current frame and a reference frame using a wavelet transform having multiple levels, producing transformed image data;

performing motion compensation to low-frequency band at a lowest level of the transformed image data producing motion-compensated, transformed image data;

applying one of either band or phase shifting methods to obtain an overcomplete expansion of the reference frame, wherein band shifting comprises shifting a band coefficient one sample and phase shifting comprises using a linear time invariant filter;

performing motion compensation of high-frequency bands at the lowest level of the transformed image data using the overcomplete expansion;

applying one-level inverse transform to the reference frame to produce a reconstructed image at a next resolution level;

setting the next resolution level to be the lowest level; and repeating the above process the process reaches the highest resolution level.

2. The method of claim 1, wherein the multiple levels of wavelet transform is substantially equal to two.

3. The method of claim 1, wherein the method further comprises providing resolution scalability by performing motion estimation to a multi-resolution representation of video signals.

4. The method of claim 1, wherein the method further comprises providing rate scalability by embedded compression of motion-compensated prediction residues at different resolutions.

5. The method of claim 1, wherein performing motion estimation further comprises hierarchical motion estimation, wherein motion vectors estimated from a low band can be used as an initial estimate of motion vectors for high bands at a same level.

6. The method of claim 1, wherein the motion compensation method of high bands further comprises:

using an overcomplete expansion of the reference frame operable to restore accuracy of a motion field;

linearly interpolating in the wavelet domain operable to enhance accuracy of the motion field;

combining the overcomplete expansion and the linear interpolation operable to enhance the accuracy of motion field in the wavelet domain.

7. The method of claim 3, wherein providing resolution scalability further comprises developing a non-expanding multi-resolution representation of video signals;

performing motion estimation and compensation independently at different resolution levels;

applying a hierarchical motion estimation technique designed for multi-resolution representation of video signals.

8. The method of claim 4, wherein providing rate scalability further comprises:

offering an embedded bit stream by sequentially compressing coefficients from low resolution level to high resolution level; and offering an embedded bit stream by sequentially scanning bit planes of coefficients within each band.

9. The method of claim 5, wherein hierarchical motion estimation further comprises:

using an estimated motion vector at a lower resolution level as an initial estimate reducing computations needed to search for an optimal motion vector at a higher resolution level;

using the estimated motion vector at a lower resolution level as an initial estimate reducing a search range needed to find the optimal motion vector at a higher resolution level.

10. The method of claim 6, wherein using the overcomplete-expansion further comprises:

applying an inverse wavelet transform at a first level;

shifting a reconstructed low band at a next level along vertical, horizontal and diagonal directions;

applying forward wavelet transform;

applying a direct linear time invariant phase shifting filter operable to obtain nonzero-phase wavelet coefficients from zero-phase coefficients; and applying a non-decimated wavelet transform to the reconstructed low-band signal.

11. The method of claim 6, wherein linearly interpolating further comprises:

applying an inverse transform operable to obtain a reconstructed signal;

linearly interpolating the reconstructed signal;

applying a forward wavelet transform; and linearly interpolating transform coefficients directly in the wavelet domain.

12. A computer-readable medium including software code that, when executed, causes the computer to:

transform both a current frame and a reference frame using a wavelet transform having multiple levels, producing transformed image data;

perform motion compensation to low-frequency band at a lowest level of the transformed image data producing motion-compensated, transformed image data;

apply band or phase shifting methods to obtain an overcomplete expansion of the reference frame, wherein band shifting further comprises shifting a band coefficient one sample and phase shifting comprises applying a linear time invariant filter;

perform motion compensation of high-frequency bands at the lowest level of the transformed image data using the overcomplete expansion;

apply one-level inverse transform to the reference frame to produce a reconstructed image at a next resolution level;

set the next resolution level to be the lowest level; and repeat the above process the process reaches the highest resolution level.

* * * * *

UNITED STATES PATENT AND TRADEMARK OFFICE
CERTIFICATE OF CORRECTION

PATENT NO. : 6,944,225 B2
APPLICATION NO. : 09/912799
DATED : September 13, 2005
INVENTOR(S) : Xin Li It is certified that error appears in the above-identified patent and that said Letters Patent is hereby corrected as shown below:

Title Page, Item (56) References Cited, US Patent Documents, insert -- 6,757,648 6/2004 Chen, et al. --;
Column 8, line 42, the word "apply" should read -- apply one of either --.

Signed and Sealed this

Eighth Day of September, 2009

David J. Kappos
*Director of the United States Patent and Trademark Office*